US006392642B1

(12) United States Patent
Wu

(10) Patent No.: US 6,392,642 B1
(45) Date of Patent: May 21, 2002

(54) DISPLAY DEVICE WHICH CAN AUTOMATICALLY ADJUST ITS RESOLUTION

(75) Inventor: Tsung-Hsun Wu, Taoyuan (TW)

(73) Assignee: Acer Communications and Multimedia Inc., Taipei (TW)

( * ) Notice: Subject to any disclaimer, the term of this patent is extended or adjusted under 35 U.S.C. 154(b) by 0 days.

(21) Appl. No.: 09/349,088

(22) Filed: Jul. 8, 1999

(51) Int. Cl.$^{7}$ .............................. G09G 5/00; H04N 5/46
(52) U.S. Cl. ........................ 345/213; 345/132; 348/558
(58) Field of Search .............................. 345/3, 99, 100, 345/132, 204, 213, 115; 348/443, 555, 556, 558, 542, 540, 543, 536, 637, 194, 524

(56) References Cited

U.S. PATENT DOCUMENTS

| | | | | | |
|---|---|---|---|---|---|
| 5,668,594 | A | * | 9/1997 | Cahill, III | 348/194 |
| 5,841,430 | A | * | 11/1998 | Kurikko | 345/213 |
| 5,917,461 | A | * | 6/1999 | Sakami et al. | 345/213 |
| 5,917,552 | A | * | 6/1999 | Van Court | 348/555 |
| 5,940,136 | A | * | 8/1999 | Abe et al. | 345/213 |
| 5,953,074 | A | * | 9/1999 | Reddy | 348/558 |
| 5,959,691 | A | * | 9/1999 | Koh | 345/99 |
| 5,986,636 | A | * | 11/1999 | Wu | 345/132 |
| 6,005,544 | A | * | 12/1999 | Eglit | 345/115 |
| 6,005,557 | A | * | 12/1999 | Wong | 345/213 |
| 6,008,791 | A | * | 12/1999 | Arai et al. | 345/132 |
| 6,043,803 | A | * | 3/2000 | Shimizu | 345/132 |
| 6,078,317 | A | * | 6/2000 | Sawada | 345/132 |
| 6,097,379 | A | * | 8/2000 | Ichiraku | 345/213 |

* cited by examiner

*Primary Examiner*—Steven Saras
*Assistant Examiner*—Paul A. Bell
(74) *Attorney, Agent, or Firm*—Winston Hsu

(57) ABSTRACT

The present invention provides a display device for displaying video frame signals transmitted from a computer. When the display device receives the video frame signals, it detects the number of horizontal scanning lines first, and then compares the number with a sampling reference table to obtain a target sampling number. If the number of pixel clocks generated by a phase locked loop does not match the target sampling number, the display device will adjust the frequency of the phase locked loop until the number of pixel clocks matches the target sampling number so that the display device can display video pictures correctly.

18 Claims, 9 Drawing Sheets

66

| Horizontal line image | 350 | 400 | 480 | 600 | 768 | 900 | 1024 |
|---|---|---|---|---|---|---|---|
| Target sampling number | 640 | 640 | 640 | 800 | 1024 | 1152 | 1280 |

DISPLAY DEVICE WHICH CAN AUTOMATICALLY ADJUST ITS RESOLUTION

BACKGROUND OF THE INVENTION

1. Field of the Invention

The invention relates to a display device, and more particularly, to a display device which can automatically adjust its resolution.

2. Description of the Prior Art

Display devices are essential for converting video frame signals transmitted from a signal source, such as a computer, into a readable video picture. Over the years, they have evolved significantly from traditional cathode ray tube monitors to modern liquid crystal displays and projectors. Regardless of the type used, a display device has to provide different resolutions depending on the need. The resolution of a video picture is determined by the way video frame signals are processed by a display device. When the video picture displayed on a display device is blurry, a user has to manually adjust the resolution. This causes great inconvenience. Therefore, further research in display devices with automatically adjustable resolutions has become critical.

Please refer to FIG. 1. FIG. 1 is a block diagram of a prior art display device 12 receiving video frame signals from a computer 10. The display device 12 is connected with the computer 10 through a cable which comprises a plurality of signal lines for receiving video frame signals transmitted from the computer 10. The video frame signals include horizontal synchronization signals 14, vertical synchronization signals 15, and video signals 16. After receiving and processing the video frame signals, the display device 12 displays a video picture.

Please refer to FIG. 2. FIG. 2 is a video picture 21 of the display device 12 at a resolution of 800×600. When the display device 12 receives the horizontal synchronization signals 14 and the vertical synchronization signals 15, and is to display a video picture 21 at a resolution of 800×600 according to a sampling reference table, the display device 12 will display each pixel one by one from the first pixel 18 of the first horizontal scanning line 20 to the $800^{th}$ pixel 19, and then move on from the first pixel 26 of the second horizontal scanning line 22 to the $800^{th}$ pixel 28 and so on until the $800^{th}$ pixel 29 of the $600^{th}$ horizontal scanning line 24 is filled. The display device 12 will then display the next video picture.

Please refer to FIG. 3. FIG. 3 is a timing diagram of the video frame signals in FIG. 1. The horizontal synchronization signals 14, vertical synchronization signals 15, and video signals 16 are represented by HS, VS, and Video respectively. When the display device 12 receives a vertical synchronization signal 15, it starts to display a new video picture. Thus video signals 16 received after time t0 can be displayed from the first row of the video picture 21. Furthermore, when the display device 12 receives a horizontal synchronization signal 14, it starts to display a new horizontal scanning line. Thus, video signal 16 received after time t1 are displayed from the next row of the video picture 21. When the display device 12 has a resolution of 800×600 and receives a vertical synchronization signal 30, it will start to display the video picture 21 upon the receipt of a horizontal synchronization signal 32. It will display 600 horizontal scanning lines one by one, and will repeat the cycle when it receives the next vertical synchronization signal 34. Therefore, at this resolution, if the frequency of the vertical synchronization signals 15 is 72 Hz, the frequency of the horizontal synchronization signals 14 is roughly 48 kHz.

The prior art display device 12 such as an LCD monitor or a projector uses a sampling reference table to obtain a resolution of a video picture. The sampling reference table comprises the frequency of the horizontal synchronization signals 14 and resolutions. When the display device 12 receives the video frame signals from the computer 10, the display device 12 receives the frequency of the horizontal synchronization signals 14 at the same time, and uses it to check the sampling reference table to obtain a corresponding resolution. If the frequency of the horizontal synchronization signals 14 is 48 kHz, the detected resolution is 800×600. If the frequency of the horizontal synchronization signals 14 is 56 kHz, the detected resolution is 1024×768.

Please refer to FIG. 4. FIG. 4 is a timing diagram of the video frame signals and pixel clocks 40. At a resolution of 800×600, the display device 12 uses a phase locked loop to generate roughly 800 pixel clocks 40 at a predetermined frequency to sample the video signals 16. The sampled video signals are then temporarily stored in an image buffer (not shown), and the LCD monitor or the projector will display the sampled video signals in the image buffer on a screen.

However, display cards in computers may be made by different manufacturers. When a poor quality display card is used, the frequency of the horizontal synchronization signals 14 transmitted to the display device 12 may be beyond a predetermined range, thus the display device 12 cannot correctly detect the corresponding resolution by checking the sampling reference table. The resolution of the display device then has to be adjusted manually. This is very inconvenient for users.

SUMMARY OF THE INVENTION

It is therefore a primary objective of the present invention to provide a display device which is able to adjust the resolution automatically to solve the above mentioned problem.

In a preferred embodiment, the present invention provides a display device for displaying video frame signals transmitted from a computer. The video frame signals include a plurality of vertical synchronization signals, horizontal synchronization signals and video signals. The display device comprises:

a screen for displaying a video picture formed by a plurality of video signals;

a displaying circuit for processing the video frame signals transmitted from the computer and displaying the video signals on the screen, the displaying circuit comprising a phase locked loop for generating pixel clocks for sampling the video signals;

a first counter for counting the number of horizontal synchronization signals between two vertical synchronization signals when video signals are active, which equals to the number of horizontal scanning lines displayed on the screen; and a control circuit for adjusting the frequency of the pixel clocks generated by the phase locked loop according to the number of horizontal scanning lines generated by the first counter so that the displaying circuit can correctly sample the video signals according to the pixel clocks generated by the phase locked loop.

It is an advantage of the present invention that the frequency of the pixel clocks generated by the phase locked loop is automatically adjusted according to the number of horizontal scanning lines generated by the first counter so that the displaying circuit can correctly sample the video signals according to the pixel clocks generated by the phase locked loop.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
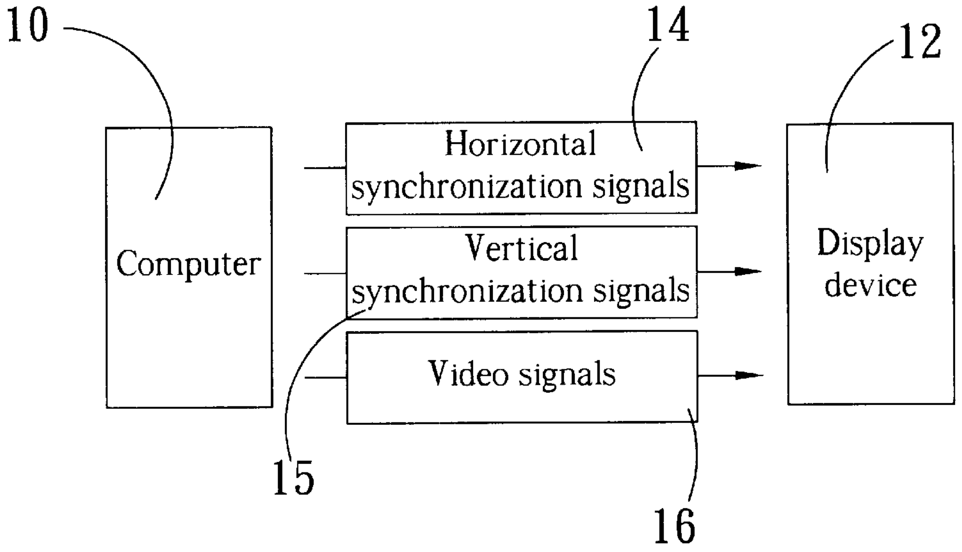
Fig. 1 Prior art
FIG. 1 is a block diagram of a prior art display device receiving video frame signals from a computer.
Figure 2:
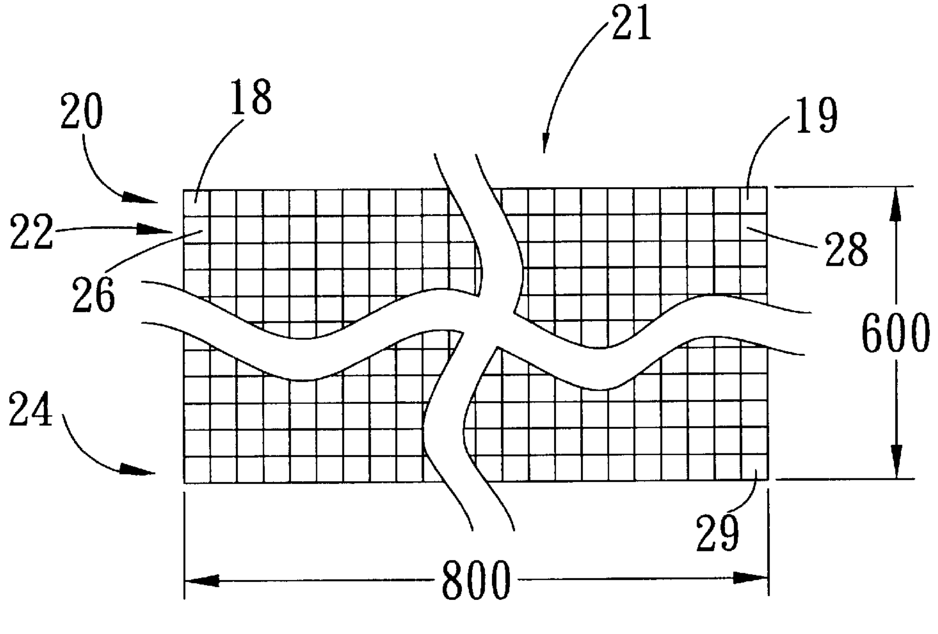
Fig. 2 Prior art
FIG. 2 is a video picture of the display device in FIG. 1 at a resolution of 800×600.
Figure 3:
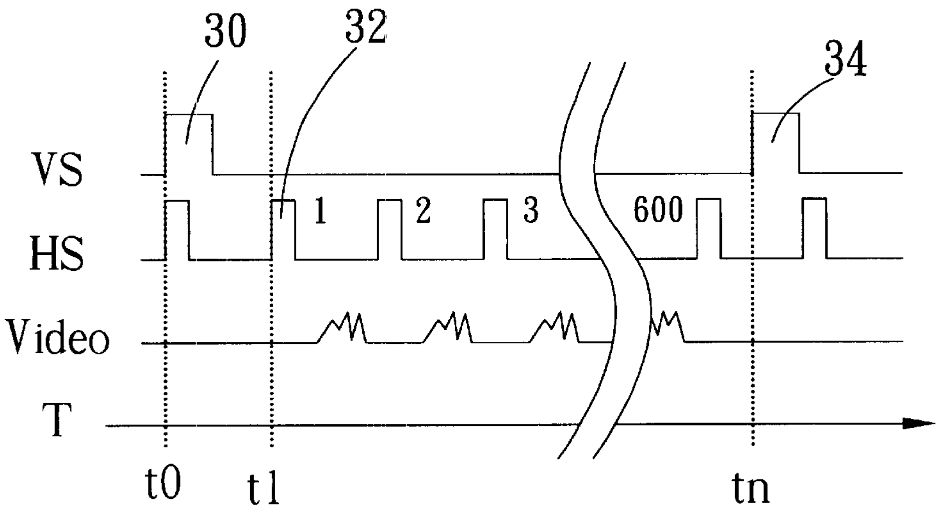
Fig. 3 Prior art
FIG. 3 is a timing diagram of the video frame signals in FIG. 1.
Figure 4:
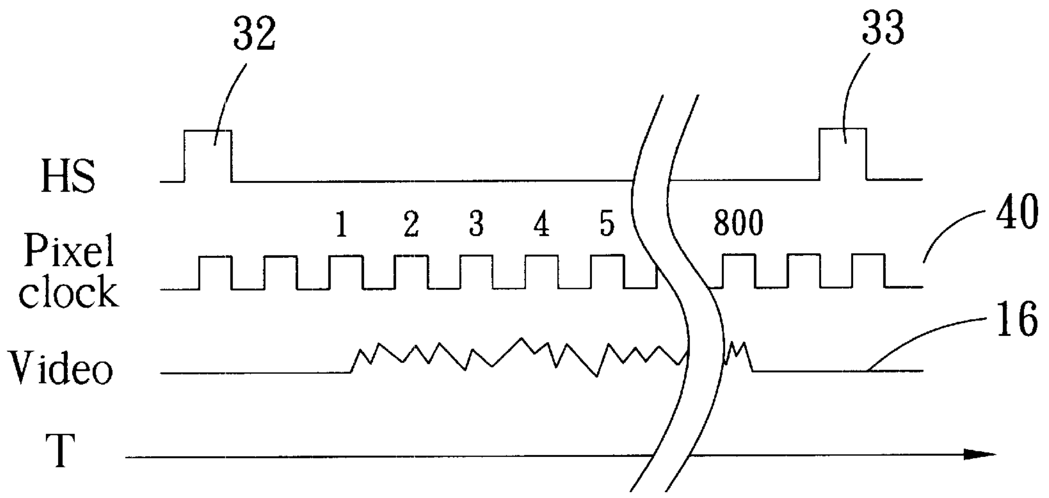
Fig. 4 Prior art
FIG. 4 is a timing diagram of the video frame signals in FIG. 1 and a pixel clock.
Figure 5:
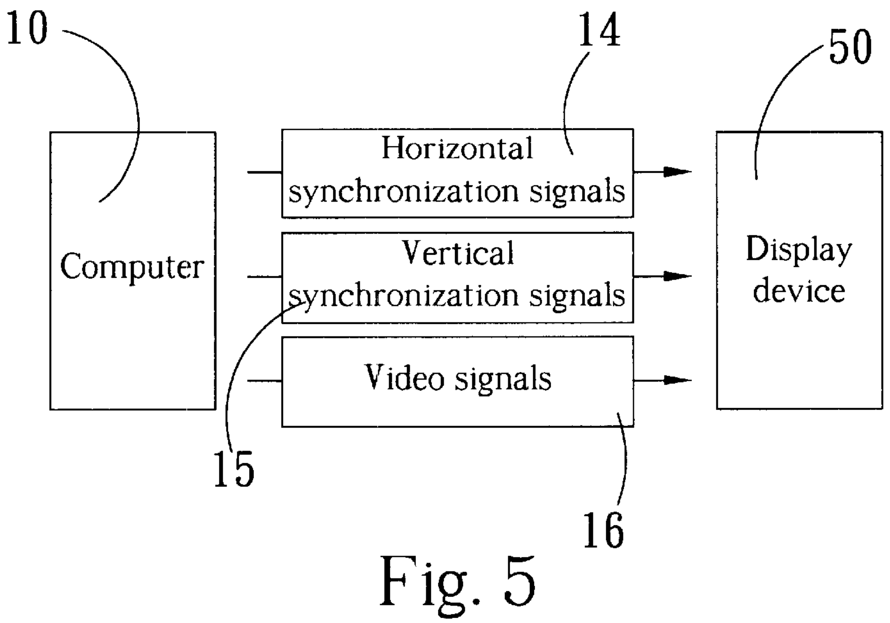
FIG. 5 is a block diagram of a display device receiving video frame signals from a computer according to the present invention.

Please refer to FIG. 5. FIG. 5 is a block diagram of a display device 50 receiving video frame signals from a signal source, such as a computer, according to the present invention. The display device 50 is electrically connected to a computer 10 through a cable which comprises a plurality of signal lines for transmitting video frame signals from the computer 10. The video frame signals include horizontal synchronization signals 14, vertical synchronization signals 15, and video signals 16. The display device 50 displays a video picture when it receives the video frame signals and the video picture is formed by a plurality of horizontal scanning lines.

Figure 6:
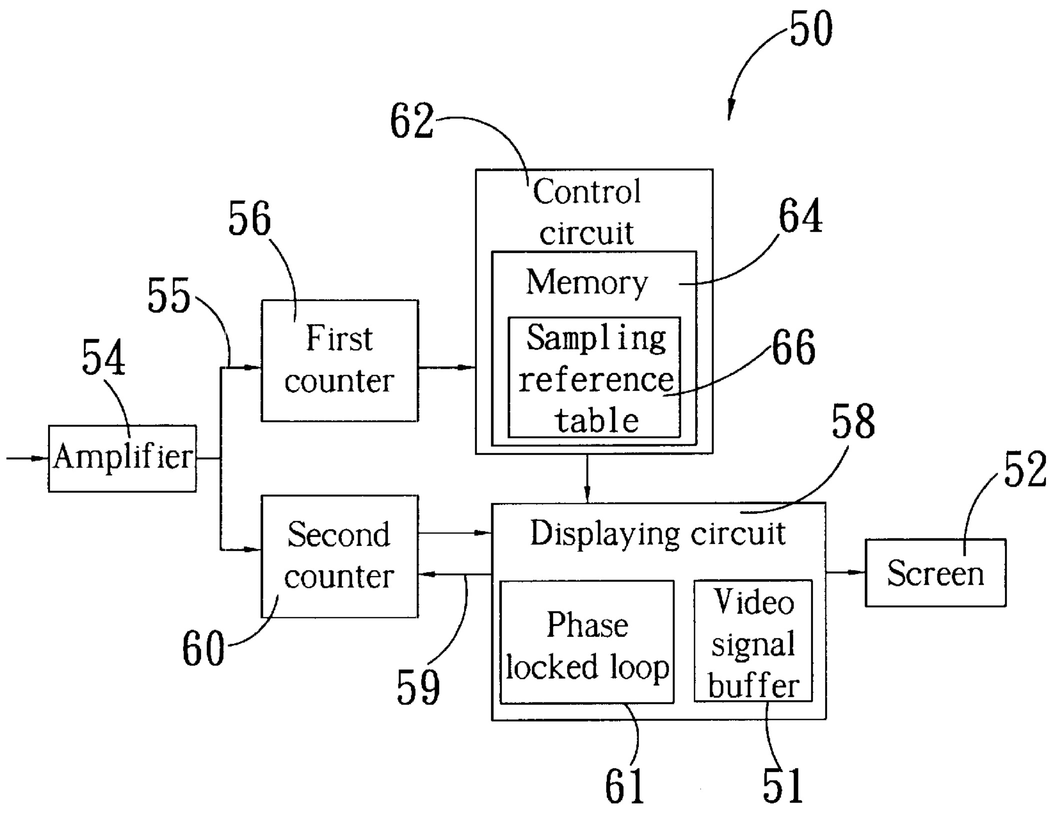
FIG. 6 is a functional block diagram of the display device in FIG. 5.

Please refer to FIG. 6. FIG. 6 is a functional block diagram of the display device 50 in FIG. 5. The display device 50 comprises a screen 52 for displaying video pictures, an amplifier 54 for amplifying the video signals 16 (0V~0.7V) into amplified video signals 55 (0V~5V), and a displaying circuit 58 for processing the video frame signals transmitted from the computer 10 and displaying the video signals 16 on the screen 52. The displaying circuit 58 comprises a phase locked loop 61 for generating pixel clocks 59 for sampling the video signals 16. The screen 52 can be an LCD panel, a plasma display panel or other displaying interfaces. It should be noted that the phase locked loop 61 can be replaced by other controllable frequency generators.

The display device 50 further comprises a first counter 56, a second counter 60, and a control circuit 62. The first counter 56 is used for counting the number of horizontal synchronization signals 14 between two vertical synchronization signals 15 when video signals 16 are active, which equals to the number of horizontal scanning lines displayed on the screen 52. The second counter 60 is used for counting the number of pixel clocks generated by the phase locked loop 61 between two horizontal synchronization signals 14 when video signals 16 are active. The control circuit 62 is used for adjusting the frequency of the pixel clocks 59 generated by the phase locked loop 61 according to the number generated by the first counter 56 so that the displaying circuit 58 can correctly sample the video signals 16 by using the pixel clocks 59. The control circuit 62 comprises a memory 64 for storing a sampling reference table 66 which contains a plurality of scanning line numbers and a corresponding target sampling number for each scanning line number. Based on the number of horizontal scanning lines generated by the first counter 56 and the sampling reference table 66, the control circuit 62 can generate a corresponding target sampling number to adjust the frequency of the phase locked loop 61.

Figures 7, 8:
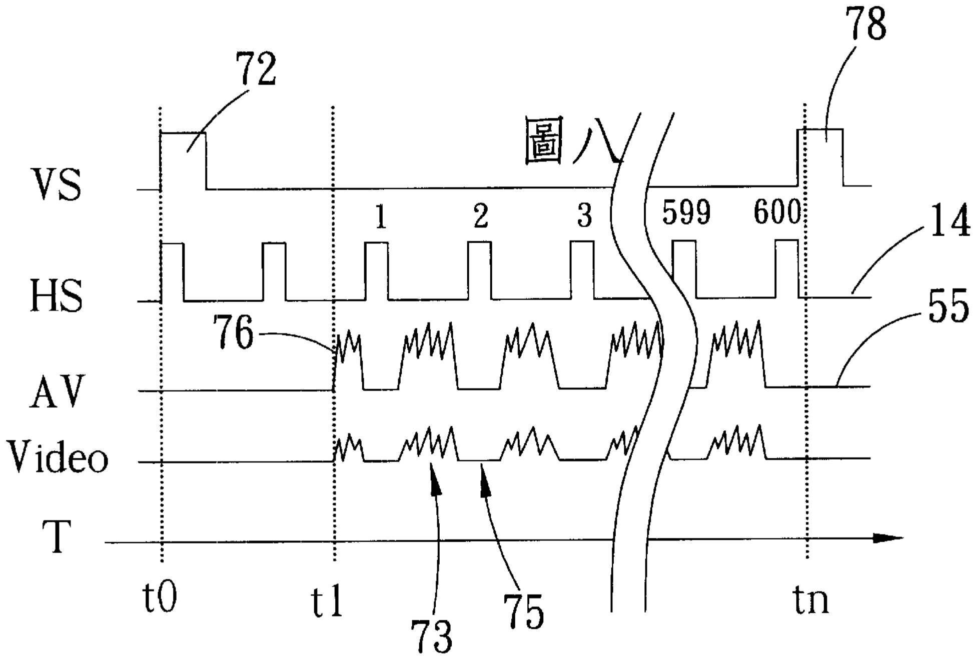
FIG. 7 is a sampling reference table in FIG. 6.
FIG. 8 is a timing diagram of the video frame signals and amplified video signals in FIG. 6.

Please refer to FIG. 7. FIG. 7 is a sampling reference table 66 in FIG. 6. In most commercial monitors, only seven VESA standard resolution modes are implemented. They are 640×350, 640×400, 640×480, 800×600, 1024×768, 1152×900, and 1280×1024. At these resolutions, one scanning line number (e.g. 600) is associated with only one target sampling number (e.g. 800). This one-to-one relationship can be used to form the sampling reference table 66 and to generate a target sampling number when a scanning line number is known.

Taking the 800×600 resolution as an example, when adjusting the resolution of the display device 50, the computer 10 will transmit a full screen of horizontal synchronization signals 14, vertical synchronization signals 15, and video signals 16 to the display device 50 for performing resolution identifications. When the number of the horizontal scanning lines counted by the first counter 56 is 600, the control circuit 62 will generate a target sampling number of 800 by checking the sampling reference table 66. And the second counter 60 will count the number of pixel clocks 59 generated by the phase locked loop 61 when the amplified video signals 55 are active. If the number of pixel clocks 59 is not 800, the displaying circuit 58 will adjust the frequency of the phase locked loop 61 until the number reaches 800. When the number reaches 800, the displaying circuit 58 will sample the video signals 16 according to the pixel clocks 59, store the sampled video signals in an image buffer 51 temporarily, and display the sampled video signals one by one on the screen 52.

Figure 9:
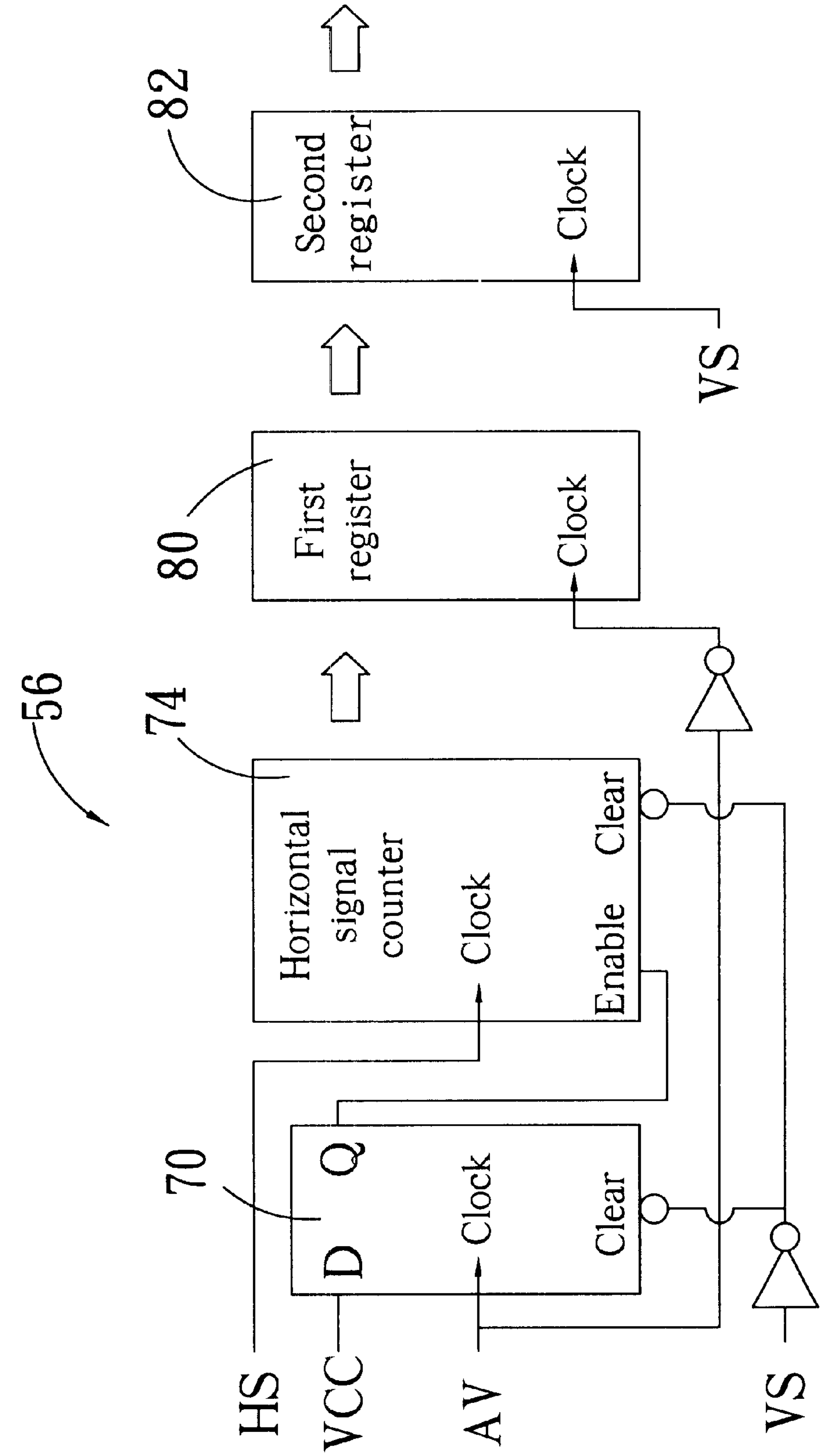
FIG. 9 is a circuit diagram of the first counter in FIG. 6.

Please refer to FIGS. 8 and 9. FIG. 8 is a timing diagram of the video frame signals and amplified video signals 55 in which AV represents amplified video signals 55. FIG. 9 is a circuit diagram of the first counter 56. The video frame signals transmitted from the computer 10 comprise a plurality of horizontal synchronization signals between two vertical synchronization signals, and a plurality of video signals 16 between every two horizontal synchronization signals 14. The video signals 16 have active portions 73 and inactive portions 75. The first counter 56 comprises a D flip-flop 70 for determining an initial time tl for receiving a first amplified active video signal 76 after a vertical synchronization signal 72 is received, a horizontal signal counter 74 for counting the number of horizontal synchronization signals received between the first amplified active video signal 76 and the next vertical synchronization signal 78 at time t1 and tn, a first register 80 for reading the number of horizontal synchronization signals counted by the horizontal signal counter 74 when the amplified video signals 55 have a falling-edge, and a second register 82 for reading the number stored in the first register 80 when the next vertical synchronization signal 78 is received.

When the display device 50 receives a full screen of video signals at an 800×600 resolution and receives a vertical synchronization signal 72, the D flip-flop 70 outputs a low voltage, and the horizontal signal counter 74 is reset to zero. When the display device 50 receives the first amplified active video signal 76, the output of the D flip-flop 70 is switched to a high voltage, and the horizontal signal counter 74 starts counting the number of horizontal synchronization signals 14. The first register 80 receives count of the horizontal signal counter 74 when the amplified video signals 55 have a falling-edge. The second register 82 receives a reading from the first register 80 when a next vertical synchronization signal 78 is received. The number read by the second register 82 is outputted to the control circuit 62. If the number is 599, the control circuit 62 will identify the number of horizontal synchronization signals 14 being 600, and will detect a resolution of 800×600 according to the sampling reference table 66 and use it to adjust the output of the phase locked loop 61.

Figure 10:
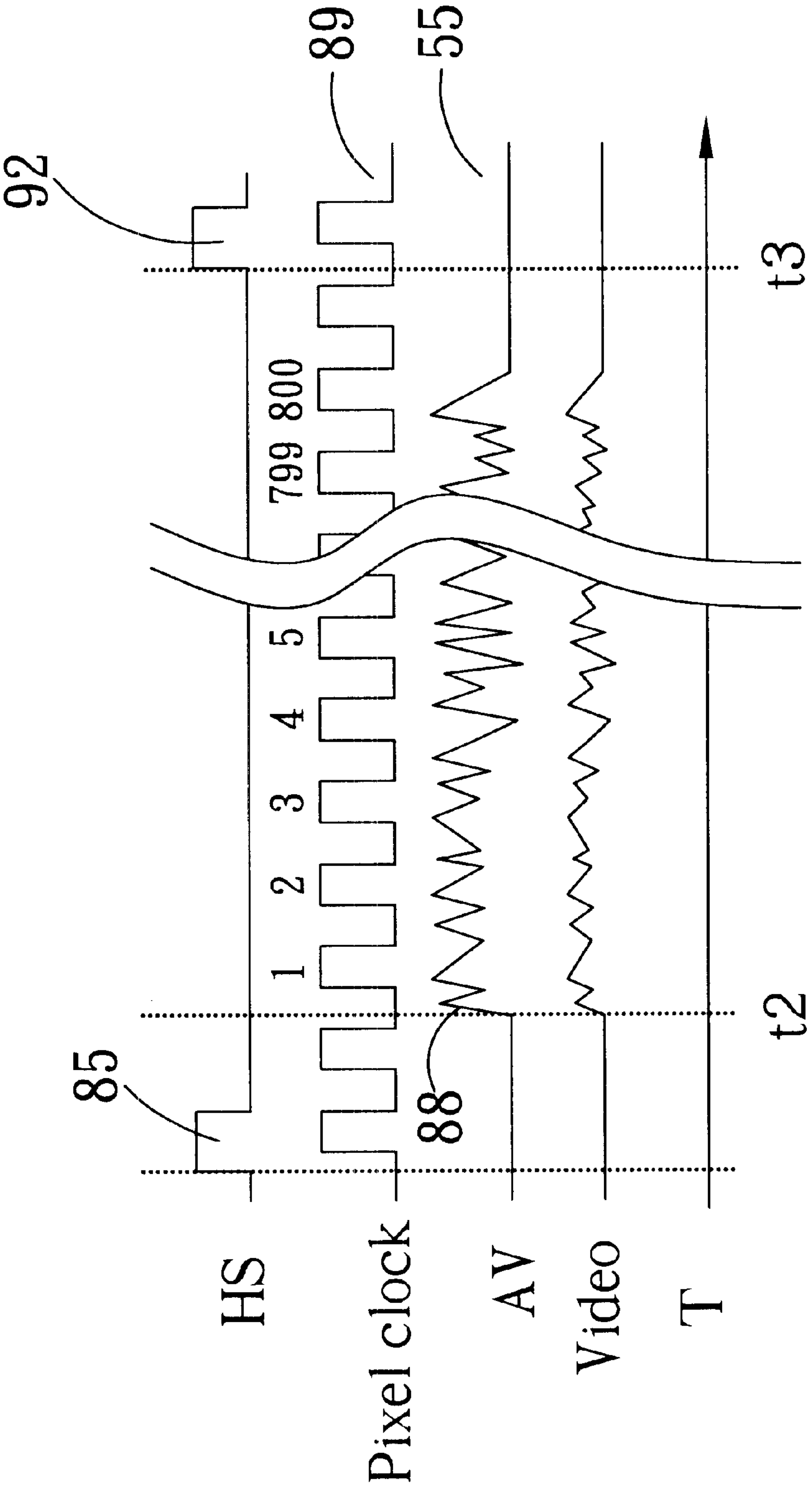
FIG. 10 is a timing diagram of the video frame signals, amplified video signals and pixel clocks in FIGS. 5 and 6.
Figure 11:
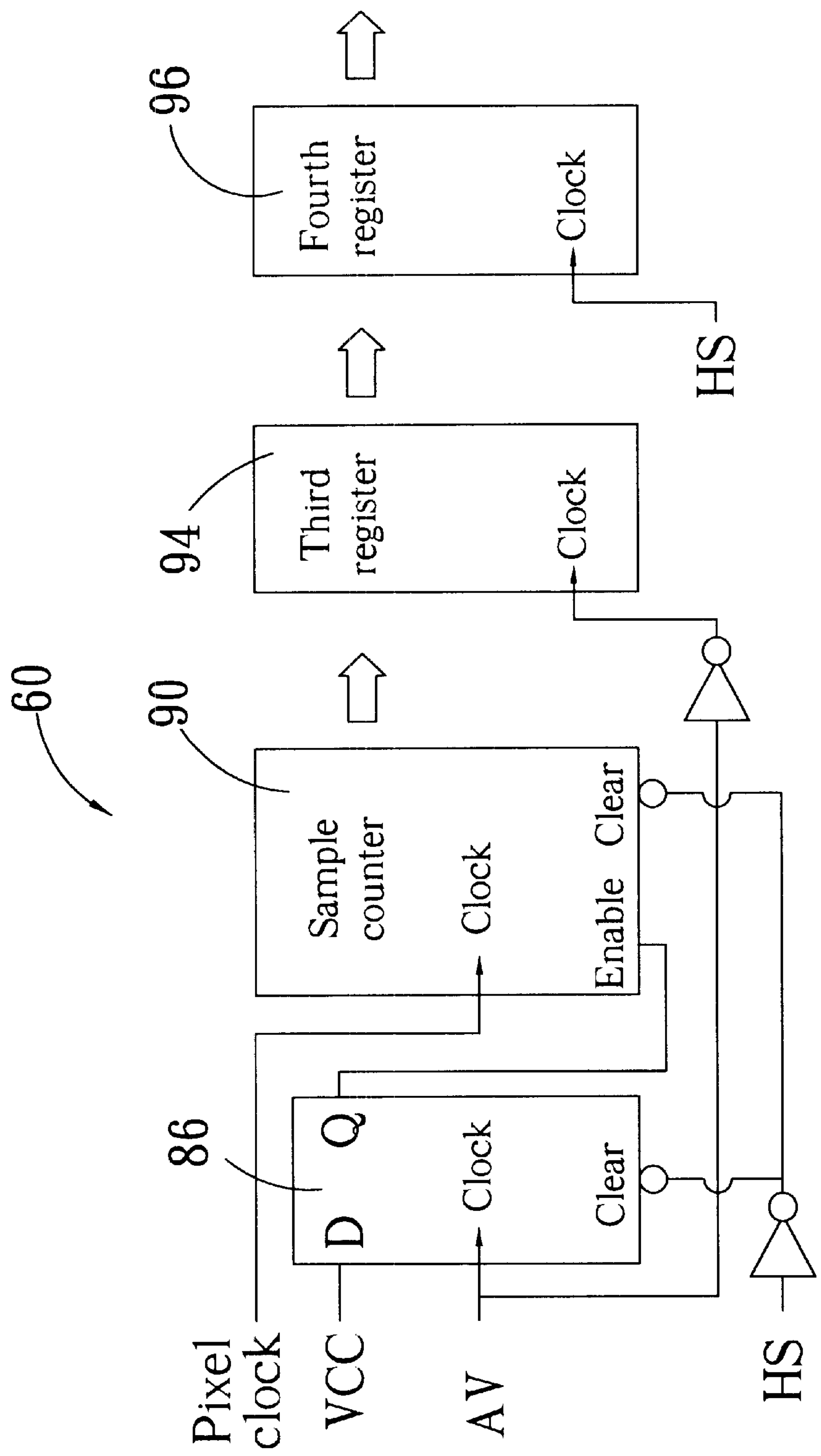
FIG. 11 is a circuit diagram of the second counter in FIG. 6.

Please refer to FIGS. 10 and 11. FIG. 10 is a timing diagram of the video frame signals, amplified video signals 55 and pixel clocks 89. FIG. 11 is a circuit diagram of the second counter 60 in FIG. 6. The second counter 60 comprises a D flip-flop 86 for determining an initial time t2 for receiving a first amplified active video signal 88 after a horizontal synchronization signal 85 is received, a sample counter 90 for counting the number of pixel clocks received between the first amplified active video signal 88 and the next horizontal synchronization signal 92 at time t2 and t3, a third register 94 for reading the number of pixel clocks counted by the sample counter 90 when the amplified video signals 55 have a falling-edge, and a fourth register 96 for reading the number of pixel clocks stored in the third register 94 when the next horizontal synchronization signal 92 is received.

When the display device 50 receives the horizontal synchronization signal 85, the D flip-flop 86 outputs a low voltage, and the sample counter 90 is reset to zero. When the first amplified active video signal 88 is received, the output of the D flip-flop 86 is switched to a high voltage, and the sample counter 90 starts counting the number of pixel clocks 59. The third register 94 receives count of the sample counter 90 when the amplified video signals 55 have a falling-edge. The fourth register 96 receives a reading from the third register 94 when a next horizontal synchronization signal 92 is received, and outputs the reading to the displaying circuit 58 for performing identifications.

Figure 12:
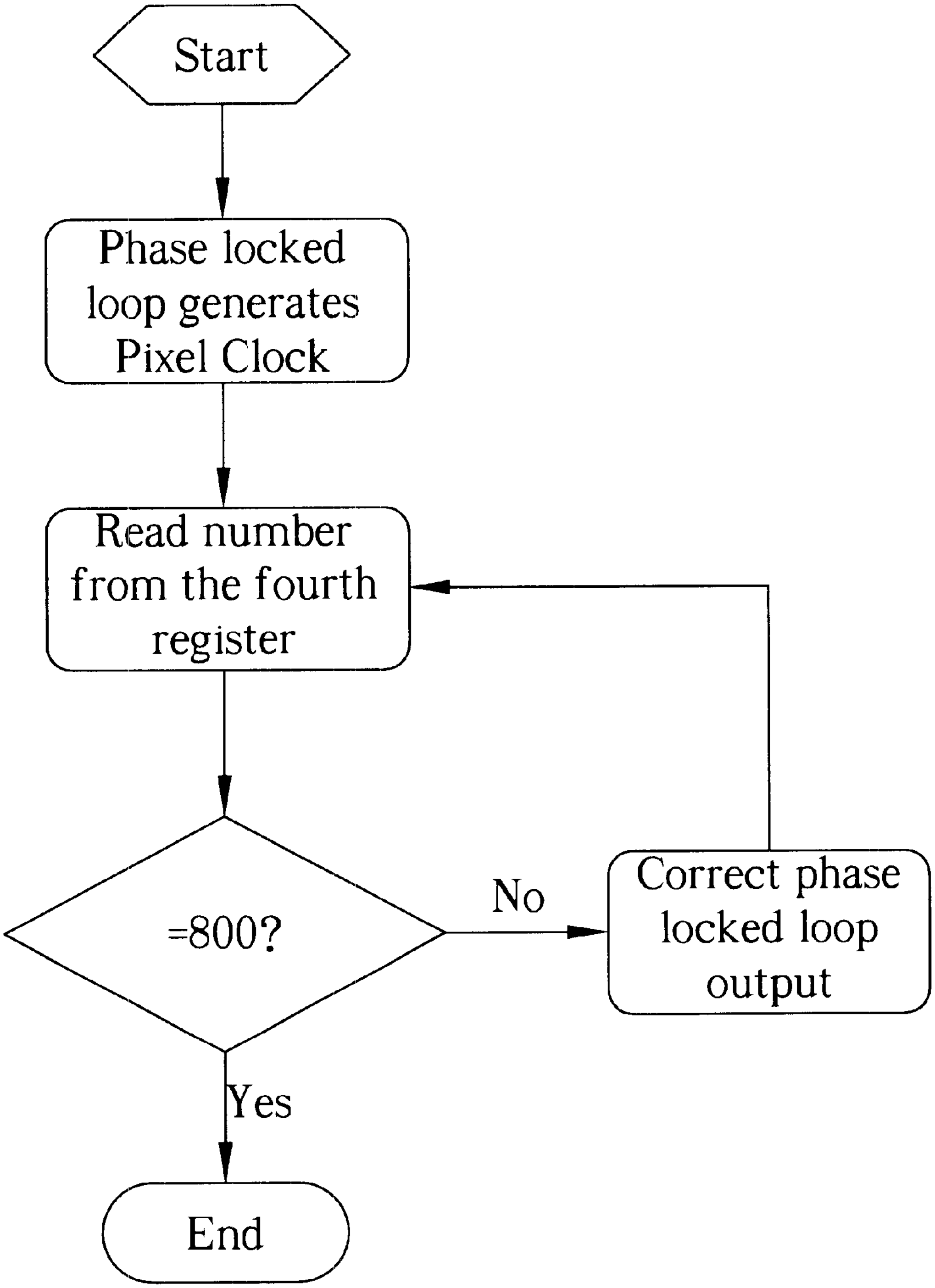
FIG. 12 is a flowchart of the phase locked loop of the displaying circuit in FIG. 5.

Please refer to FIG. 12. FIG. 12 is a flowchart of the phase locked loop 61 of the displaying circuit 58. When an 800×600 resolution is identified, the phase locked loop 61 initially generates pixel clocks at a predetermined frequency, and the displaying circuit 58 reads the number stored in the fourth register 94. If the number read from the fourth register 94 is not 800, the frequency of the phase locked loop 61 will be adjusted until it reaches 800. Thus, video pictures can be displayed on the screen 52 correctly.

Figure 13:
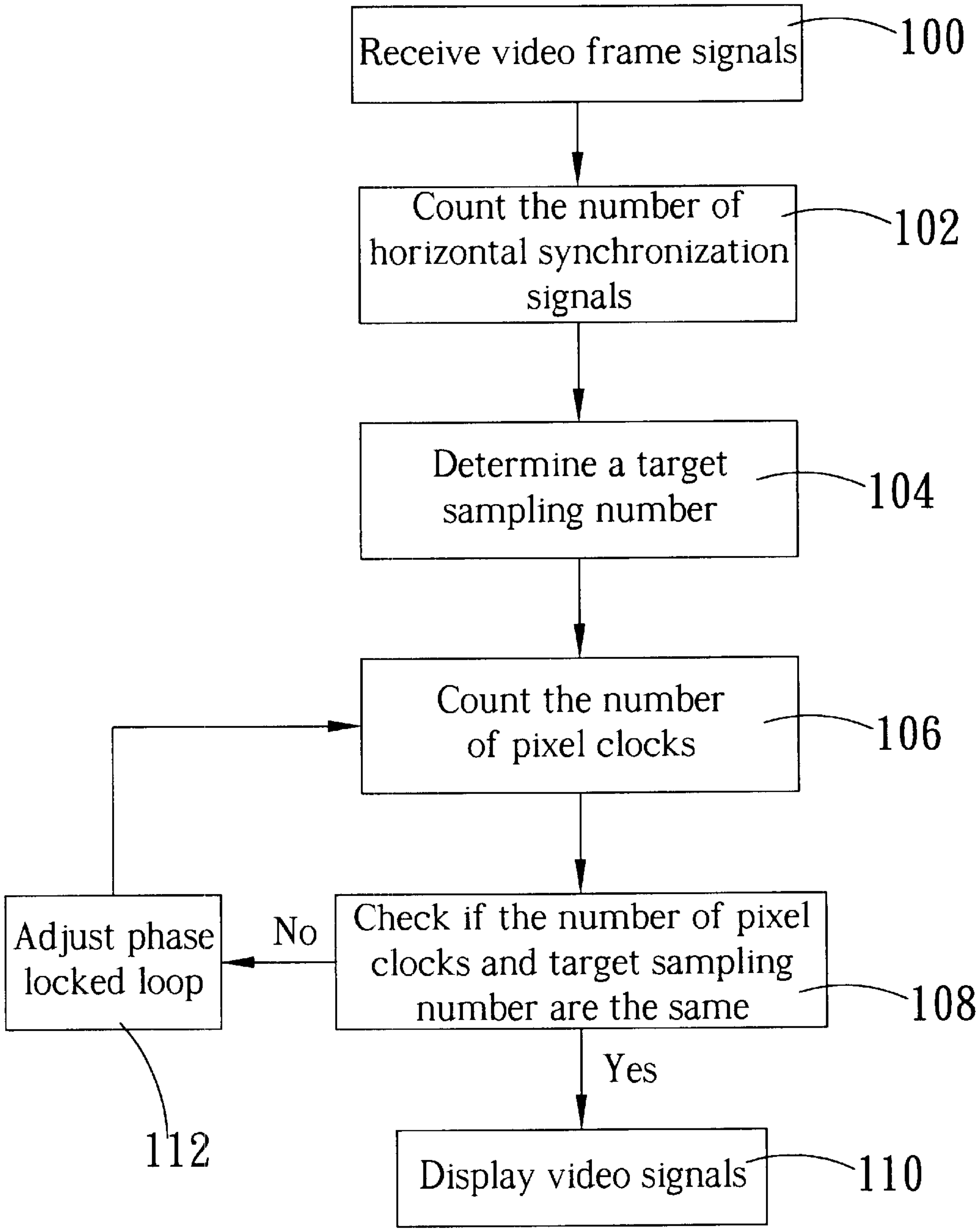
FIG. 13 is a flowchart of displaying a video picture.

Please refer to FIG. 13. FIG. 13 is a flowchart of displaying a video picture. When the sampling reference table 66 is stored in the memory 64, the method of adjusting the display of a video picture can be summarized in the following steps:

Step 100: receiving video frame signals from the computer 10;

Step 102: using the first counter 56 to count the number of horizontal synchronization signals 14 between two consecutive vertical synchronization signals 15 when amplified video signals 55 are active;

Step 104: determining a target sampling number according to the number of horizontal synchronization signals generated by the first counter 56 and the sampling reference table 66;

Step 106: using the second counter 60 to count the number of pixel clocks between two consecutive horizontal synchronization signals 14 when amplified video signals 55 are active;

Step 108: checking if the number of pixel clocks equals to the target sampling number; if not, go to step 112;

Step 110: displaying video signals on the screen 52.

Step 112: adjusting the frequency of the phase locked loop 61, then go to step 106;

Compared with the prior art, the frequency of the pixel clocks 89 generated by the phase locked loop 61 is automatically adjusted according to the number of horizontal scanning lines generated by the first counter 56 so that the displaying circuit 58 can correctly sample the video signals 16 according to the pixel clocks 89 generated by the phase locked loop 61.

Those skilled in the art will readily observe that numerous modifications and alterations of the device may be made while retaining the teachings of the invention. Accordingly, the above disclosure should by construed as limited only by the metes and bounds of the appended claims.

What is claimed is:

1. A display device for displaying video frame signals transmitted from a signal source, the video frame signals comprising a plurality of vertical synchronization signals, horizontal synchronization signals and video signals, the display device comprising:

a screen for displaying a video picture formed by a plurality of video signals;

a displaying circuit for processing the video frame signals transmitted from the signal source and displaying the video signals on the screen, the displaying circuit comprising a frequency generator for generating pixel clocks for sampling the video signals;

a first counter for counting the number of horizontal synchronization signals presented between two consecutive vertical synchronization signals when video signals are active, which equals to the number of horizontal scanning lines displayed on the screen; and a control circuit for adjusting the frequency of the pixel clocks generated by the frequency generator according to the number of horizontal scanning lines counted by the first counter so that the displaying circuit can correctly sample the video signals according to the pixel clocks generated by the frequency generator.

2. The display device of claim 1 further comprising a second counter for counting the number of pixel clocks generated by the frequency generator between two horizontal synchronization signals when video signals are active, wherein the control circuit will determine a target sampling number according to the number of horizontal scanning lines generated by the first counter, and adjust the frequency of the frequency generator until the number of pixel clocks counted by the second counter equals to the target sampling number.

3. The display device of claim 2 wherein the control circuit comprises a memory for storing a sampling reference table which contains a plurality of scanning line numbers and a corresponding target sampling number for each scanning line number, and the control circuit uses the number of horizontal scanning lines generated by the first counter and the sampling reference table to generate the corresponding target sampling number to adjust the frequency of the frequency generator.

4. The display device of claim 1 wherein a plurality of horizontal synchronization signals are received between two consecutive vertical synchronization signals, and video signals are generated between two consecutive horizontal synchronization signals.

5. The display device of claim 4 wherein the display device is connected with the signal source through a cable which comprises a plurality of signal lines, and the vertical synchronization signals, horizontal synchronization signals and video signals are transmitted to the display device through different signal lines.

6. The display device of claim 1 wherein the screen is a liquid crystal display panel.

7. The display device of claim 1 wherein the displaying circuit is a projective-type displaying circuit for converting the video frame signals transmitted from the signal source into an optical image and projecting it onto the screen.

8. The display device of claim 1 further comprising an image buffer for temporarily storing the video signals transmitted from the displaying circuit.

9. The display device of claim 1 wherein the frequency generator is a phase locked loop.

10. A method for processing video frame signals, the video frame signals comprising a plurality of vertical synchronization signals, horizontal synchronization signals and video signals, the video signals being sampled according to a plurality of pixel clocks, the method comprising:

adjusting the frequency of the pixel clocks according to the number of horizontal synchronization signals presented between two consecutive vertical synchronization signals when video signals are active, which equals to the number of horizontal scanning lines displayed on a screen.

11. The method of claim 10 further comprising the following step:

determining a target sampling number according to the number of horizontal scanning lines so as to adjust the frequency of the pixel clocks until the number of pixel clocks presented between two consecutive horizontal synchronization signals when video signals are active equals to the target sampling number.

12. The method of claim 11 further comprising the following step:

storing a sampling reference table which contains a plurality of scanning line numbers and a target sampling number corresponding to each scanning line number, the target sampling number being generated according to the number of horizontal scanning lines and the sampling reference table.

13. The method of claim 10 wherein a plurality of horizontal synchronization signals are received between two consecutive vertical synchronization signals, and video signals are generated between two consecutive horizontal synchronization signals.

14. A display device for displaying video frame signals on a screen, the video frame signals comprising a plurality of vertical synchronization signals, horizontal synchronization signals and video signals, the video signals having active portions and inactive portions, the display device comprising:

a frequency generator for generating pixel clocks;

a displaying circuit for sampling the video signals according to the pixel clocks and displaying the sampled video signals on the screen;

a first counter for counting the number of horizontal synchronization signals in a time interval from the first active video signal to the last active video signal presented between two consecutive vertical synchronization signals; and a control circuit for adjusting the frequency of the pixel clocks generated by the frequency generator according to the number counted by the first counter.

15. The display device of claim 14 further comprising a second counter for counting the number of pixel clocks generated by the frequency generator during a time interval when video signals are active between two consecutively presented horizontal synchronization signals, wherein the control circuit will determine a target sampling number according to the number counted by the first counter, and adjust the frequency of the frequency generator until the number of pixel clocks counted by the second counter equals to the target sampling number.

16. The display device of claim 15 wherein the control circuit comprises a memory for storing a sampling reference table which contains a plurality of scanning line numbers and a target sampling number corresponding to each scanning line number, and the control circuit uses the number counted by the first counter and the sampling reference table to generate the corresponding target sampling number.

17. The display device of claim 14 wherein a plurality of horizontal synchronization signals are received between two consecutive vertical synchronization signals, and video signals are generated between two consecutive horizontal synchronization signals.

18.A method of adjusting a video signal display by adjusting a frequency of pixel clocks to change the sampling number of video frame signals, the video frame signals comprising a plurality of vertical synchronization signals, horizontal synchronization signals and video signals, the video signals having active portions and inactive portions, the method comprising steps of:

(1) counting the number of horizontal synchronization signals presented between two consecutive vertical synchronization signals in a first time interval from a first active video signal to a last active video signal;

(2) counting the number of pixel clocks in a second time interval corresponding to active portions of the video signals presented between two consecutively presented horizontal synchronization signals;

(3) determining a target sampling number according to the number of horizontal synchronization signals counted in step (1);

(4)adjusting the frequency of the pixel clocks until the number counted in step (2) equals to the target sampling number.

* * * * *